Figure 11:
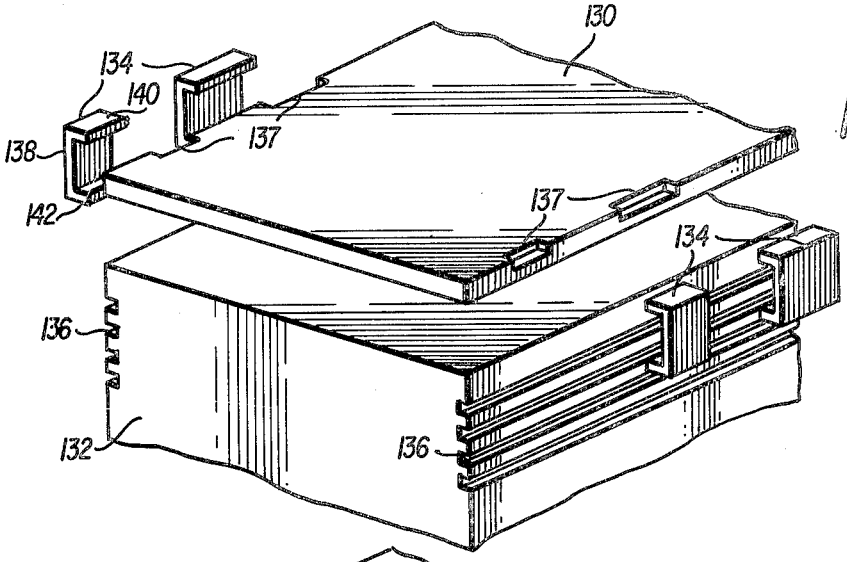
Figure 15:
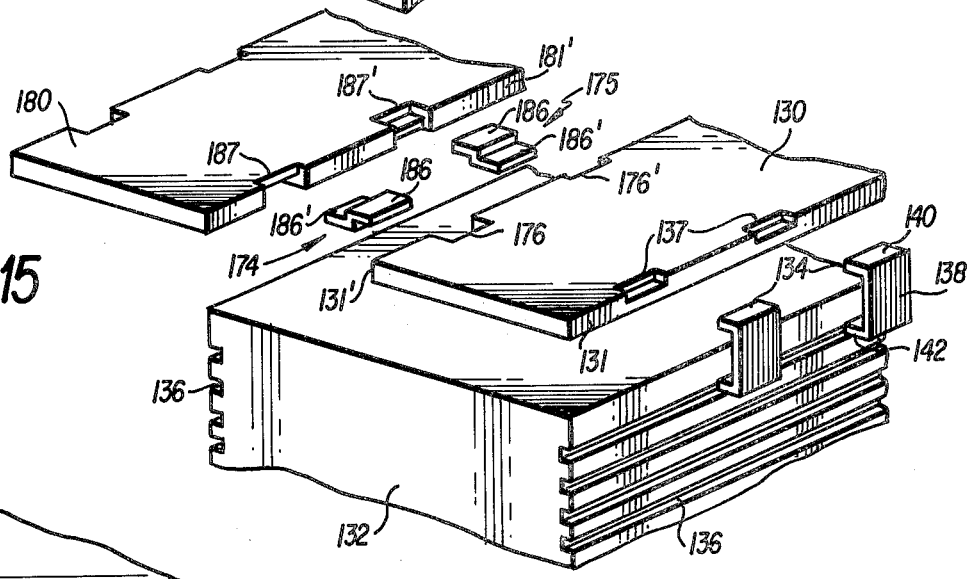
Figure 12:
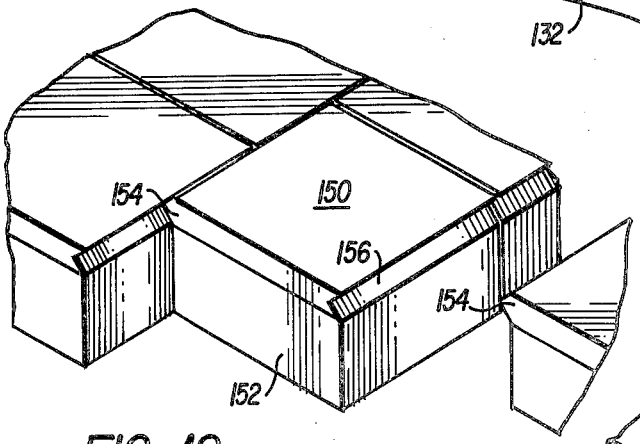
Figure 13:
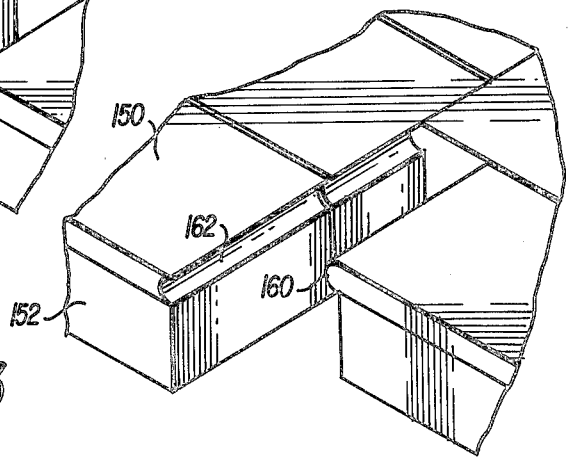

United States Defensive Publication [19] (H) [11] T993,002

Kaplan et al. [43] Apr. 1, 1980

[54] REFRACTORY SURFACES FOR ALUMINA REDUCTION CELL CATHODES AND METHODS FOR PROVIDING SUCH SURFACES

[75] Inventors: Howard I. Kaplan, Florence, Ala.; Jerry H. Bryce, Lawrenceburg, Tenn.; Thomas J. Johnston, Rogersville, Ala.; Jan M. Pottinger; Curtis J. McMinn, both of Florence, Ala.; Alton T. Tabereaux, Sheffield, Ala.; John T. Willett; Nolan E. Richards, both of Florence, Ala.

[73] Assignee: Reynolds Metals Company, Richmond, Va.

[21] Appl. No.: 43,242

[22] Filed: May 29, 1979

[51] Int. Cl.[2] ..... C25C 3/08; C25C 7/02

[52] U.S. Cl. ..... 204/243 R; 266/283

[57] ABSTRACT

The disclosure pertains to alumina reduction cells which employ refractory materials to provide a molten-aluminum contacting surface for the cathode. Specifically, configurations and methods are described according to which refractory hard metal tiles are secured to a carbonaceous substrate to produce composites suitable for constructing a molten-aluminum contacting surface for the use stated. The tiles are wettable by molten aluminum and are inert chemically to the reduction cell electrolyte. Configurations for coupling and interlocking such tiles are also described. When the tiles are coupled or interlocked in the manner taught, it is possible to achieve a built-up refractory surface which remains chemically and mechanically stable in a reduction cell environment. The refractory hard metal materials used are included among the borides, nitrides and carbides of Group IV, V, and VI of the Periodic System, particularly compounds of titanium and zirconium, and especially titanium-diboride and titanium-diboride aluminum-nitride mixtures.

53 Claims, 3 Sheets Drawing,

51 Pages Specification

The file of this unexamined application may be inspected and copies thereof may be purchased (849 O.G. 1221, Apr. 9, 1968).

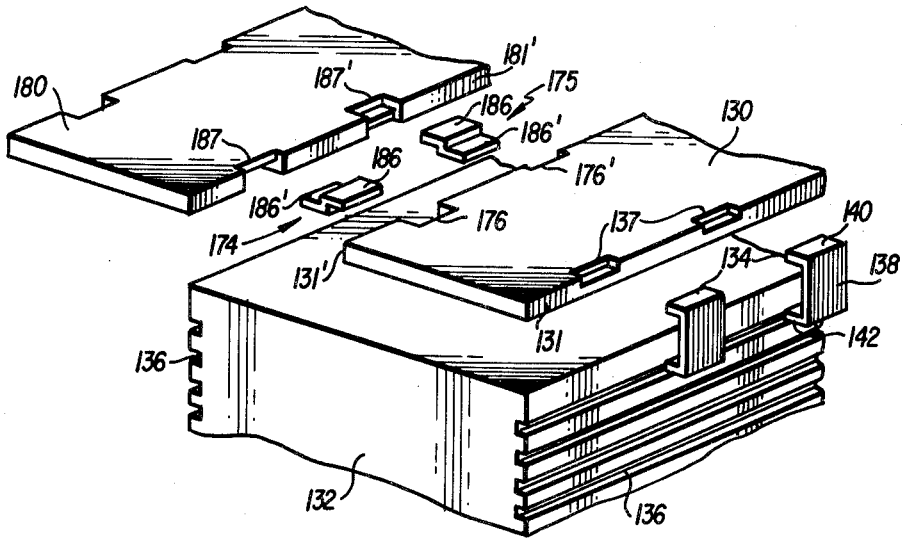

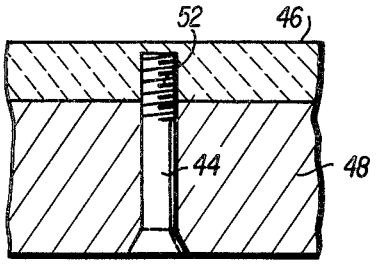
FIG. 5
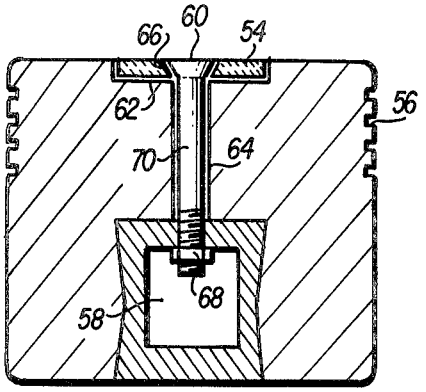
FIG. 6
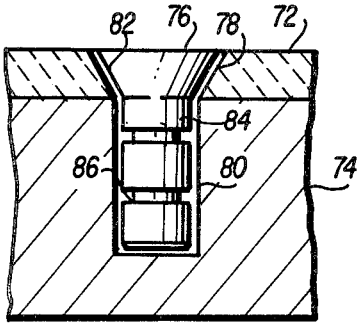
FIG. 7
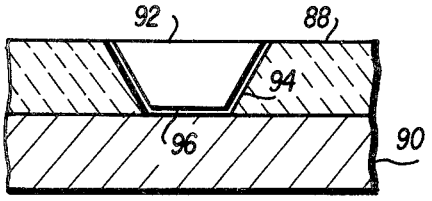
FIG. 8
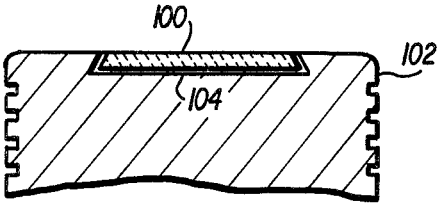
FIG. 9
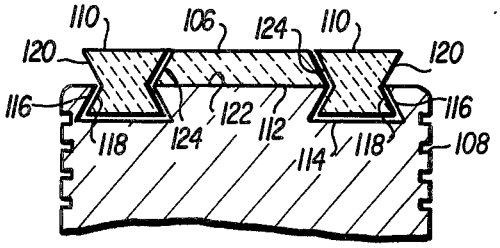
FIG. 10
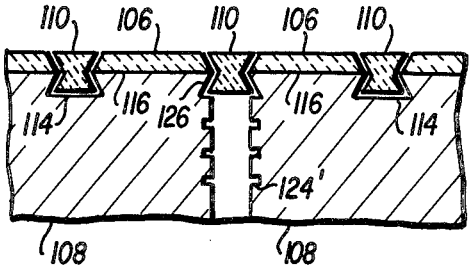
FIG. 14
FIG. 16
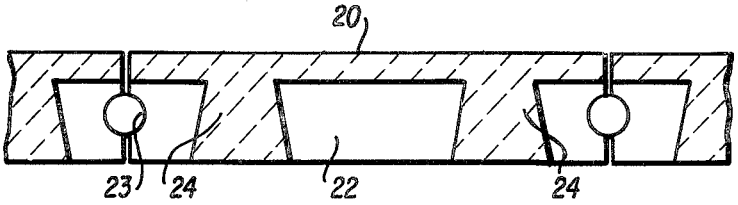

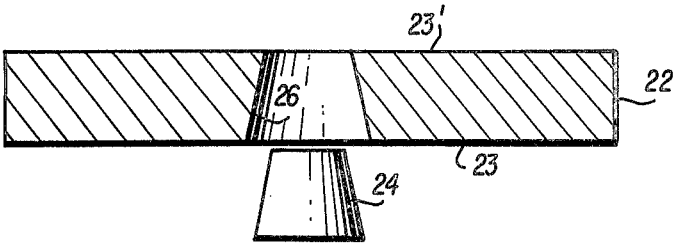
FIG. 1a
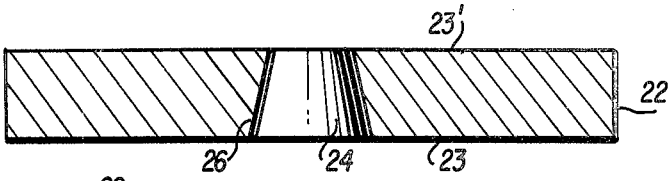
FIG. 1b
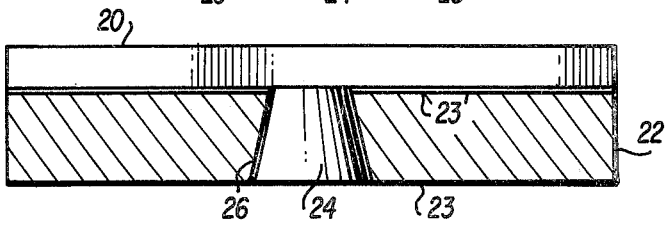
FIG. 1c
FIG. 2
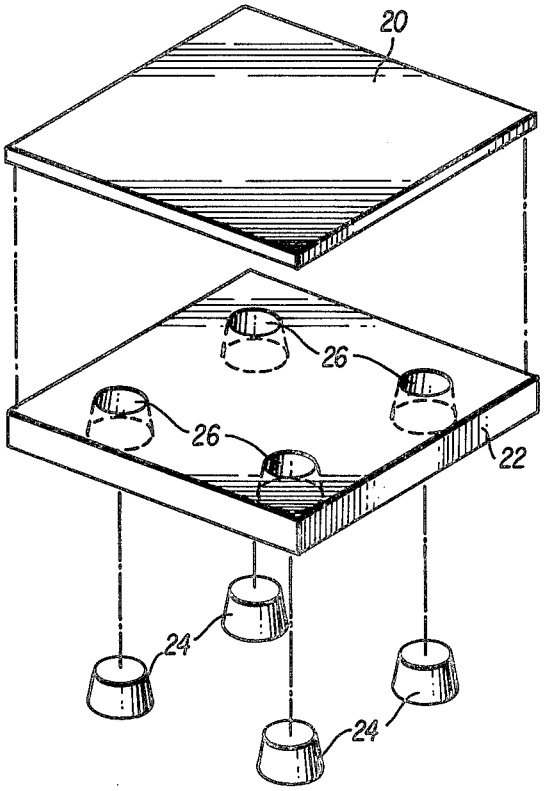
FIG. 3
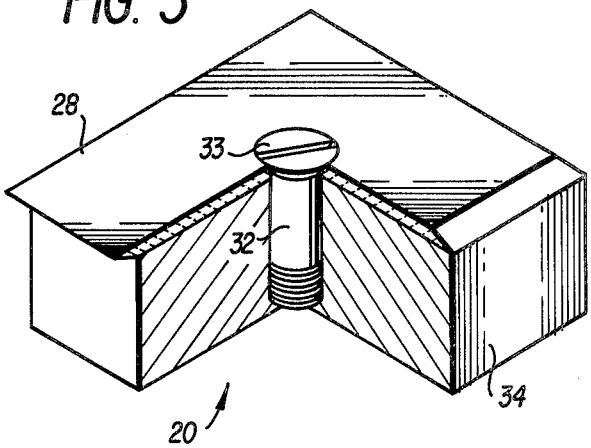
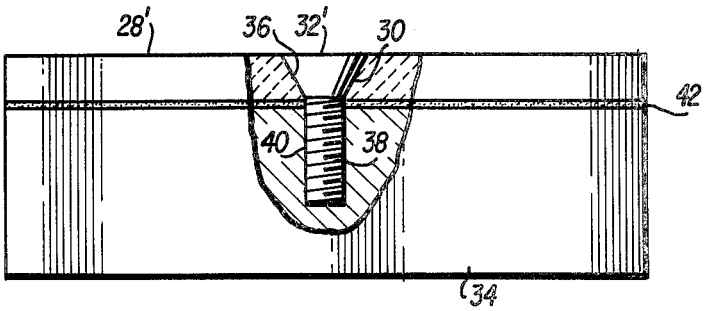
FIG. 4